(12) United States Patent
Gupta

(10) Patent No.: US 11,537,330 B2
(45) Date of Patent: Dec. 27, 2022

(54) SELECTIVELY IMPROVING RAID OPERATIONS LATENCY

(71) Applicant: NETAPP, INC., Sunnyvale, CA (US)

(72) Inventor: Ratnesh Gupta, Dublin, CA (US)

(73) Assignee: NETAPP, INC., San Jose, CA (US)

(*) Notice: Subject to any disclaimer, the term of this patent is extended or adjusted under 35 U.S.C. 154(b) by 618 days.

(21) Appl. No.: 16/428,378

(22) Filed: May 31, 2019

(65) Prior Publication Data
US 2019/0286374 A1 Sep. 19, 2019

Related U.S. Application Data

(63) Continuation of application No. 15/583,946, filed on May 1, 2017, now Pat. No. 10,353,642.

(51) Int. Cl.
*G06F 3/06* (2006.01)
*G06F 11/10* (2006.01)

(52) U.S. Cl.
CPC .......... *G06F 3/0689* (2013.01); *G06F 3/0604* (2013.01); *G06F 3/0611* (2013.01); *G06F 3/0659* (2013.01); *G06F 3/0665* (2013.01); *G06F 11/1092* (2013.01); *G06F 3/061* (2013.01); *G06F 3/0619* (2013.01)

(58) Field of Classification Search
CPC .... G06F 3/0689; G06F 3/0604; G06F 3/0611; G06F 3/0659; G06F 3/0665; G06F 11/1092
See application file for complete search history.

(56) References Cited

U.S. PATENT DOCUMENTS

| | | | |
|---|---|---|---|
| 6,799,284 B1* | 9/2004 | Patel | G06F 11/1076 714/6.21 |
| 9,766,980 B1 | 9/2017 | Anantharaman et al. | |
| 2005/0283654 A1 | 12/2005 | Wood et al. | |
| 2005/0283655 A1 | 12/2005 | Ashmore et al. | |
| 2013/0246707 A1 | 9/2013 | Bourbonnais et al. | |
| 2014/0337667 A1 | 11/2014 | Postage et al. | |
| 2016/0217040 A1* | 7/2016 | Jin | G06F 3/064 |
| 2017/0132099 A1* | 5/2017 | Li | G06F 11/2094 |
| 2017/0177221 A1 | 6/2017 | Trehan et al. | |
| 2017/0364392 A1 | 12/2017 | Spivak et al. | |

OTHER PUBLICATIONS

Non-Final Office Action on co-pending U.S. Appl. No. 15/583,932 dated Feb. 6, 2019.
Notice of Allowance on co-pending U.S. Appl. No. 15/583,932 dated Aug. 14, 2019.

* cited by examiner

*Primary Examiner* — Idriss N Alrobaye
*Assistant Examiner* — Brooke J Taylor
(74) *Attorney, Agent, or Firm* — Loza & Loza, LLP; Tejinder Singh

(57) ABSTRACT

Presented herein are methods, non-transitory computer readable media, and devices for selectively limiting the amount of data in a file system, which include: determining a reparity bit value for a write disk block range, wherein the reparity bit is configured to track a number of writes in progress to a stripe range; determining the reparity bit value; updating a threshold written disk block number as a highest disk block number of the reparity bit value; and initiating a RAID operation until it reaches the threshold written disk block number, wherein the threshold written disk block number comprises a maximum written disk block number representing the last disk block number written.

20 Claims, 5 Drawing Sheets

SELECTIVELY IMPROVING RAID OPERATIONS LATENCY

CROSS-REFERENCE TO RELATED APPLICATION

This patent application claims priority of and is a continuation of U.S. patent application Ser. No. 15/583,946, filed on May 1, 2017, now U.S. Pat. No. 10,353,642, the disclosure of which is incorporated herein by reference in its entirety.

TECHNICAL FIELD

The present disclosure relates generally to mass data storage networks and data storage filing systems. More particularly, aspects of this disclosure relate to methods, non-transitory computer readable media, and devices for improving the completion time for RAID operations such as RAID reconstruction, well disk copy, rapid RAID recovery and RAID parity scrub.

BACKGROUND

The technology of Redundant Array of Independent Disks (RAID) has been widely used in storage systems to achieve high data performance and reliability. By maintaining redundant information within an array of disks, RAID can recover the data in case one or more disk failures occur in the array. The process of recovering data from disk failures in a RAID system is called data reconstruction. The data reconstruction process is very critical to both the performance and reliability of the RAID systems.

As an example, when a disk fails in the array, the array enters a degraded mode, and user I/O requests fails on the failed disk have to reconstruct data on the fly, which is quite expensive and causes great performance overhead. Moreover, the user I/O processes and reconstruction process run concurrently and compete for the disk bandwidth with each other, which further degrades the system performance. On the other hand, when the RAID system is recovering from one disk failure, a second disk failure may occur, which will exceed the system's failure tolerance ability, and cause permanent data loss. Thus, a prolonged data reconstruction process will introduce a long period of system vulnerability, and severely degrade system reliability.

FIG. 1 shows how a typical RAID system 50 performs an online reconstruction when a disk fails. The reconstruction process can reconstruct the RAID stripes of the RAID system 50 sequentially from the first to the last RAID stripe. To construct each RAID stripe, the reconstruction process can read out the corresponding data and parity blocks from the surviving disks (5, 15, 20, 25), regenerate the data block on a failed disk 10 through parity computation, and write the data block back to a replacing disk 30. During the online reconstruction, user I/O requests (40, 45) which fall onto the failed disk have to reconstruct the data on the fly. For a read request 40, all the other data and parity blocks in the parity group will be read out and the requested data will be reconstructed through parity computation. For a write request 45, all the other data blocks except the parity block will be read out, then the new parity block will be reconstructed and written back to the parity disk. Therefore, the user I/O processing in the reconstruction mode is more complicated and has lower performance than in the normal mode. Furthermore, the reconstruction process and the user I/O processes are running separately from each other, and the user I/O processing will not return to normal mode until the entire failed disk is reconstructed.

For data reconstruction, an ideal scenario is offline reconstruction, in which the array stops serving the user I/O requests, and lets the data reconstruction process run at its full speed. However, this scenario is not practical in most production environments, where the RAID systems are required to provide uninterrupted data services even when they are recovering from disk failures. In other words, RAID systems in production environments are undergoing online reconstruction, in which the reconstruction process and user I/O processes are running concurrently.

In previous work, several methods have been proposed to optimize the reconstruction process of RAID systems. The Workout method aims to redirect the user write data cache and popular read data to a surrogate RAID, and reclaim the write data to the original RAID when the reconstruction of original RAID completes. By doing so, Workout tries to separate the reconstruction process from the user I/O processes and leave the reconstruction process undisturbed. Another previous method is called Victim Disk First (VDF). VDF defines the system DRAM cache policy that caches the data in the failed disk in higher priority, so that the performance overhead of reconstructing the failed data on the fly can be minimized. A third previous work is called live block recovery. The method of live block recovery aims to recover only live file system data during reconstruction, skipping the unused data blocks. However, this method relies on the passing of file system information to the RAID block level, and thus requires significant changes of existing file systems.

Based on the above concerns, the data reconstruction process should be shortened as much as possible.

Figure 1:
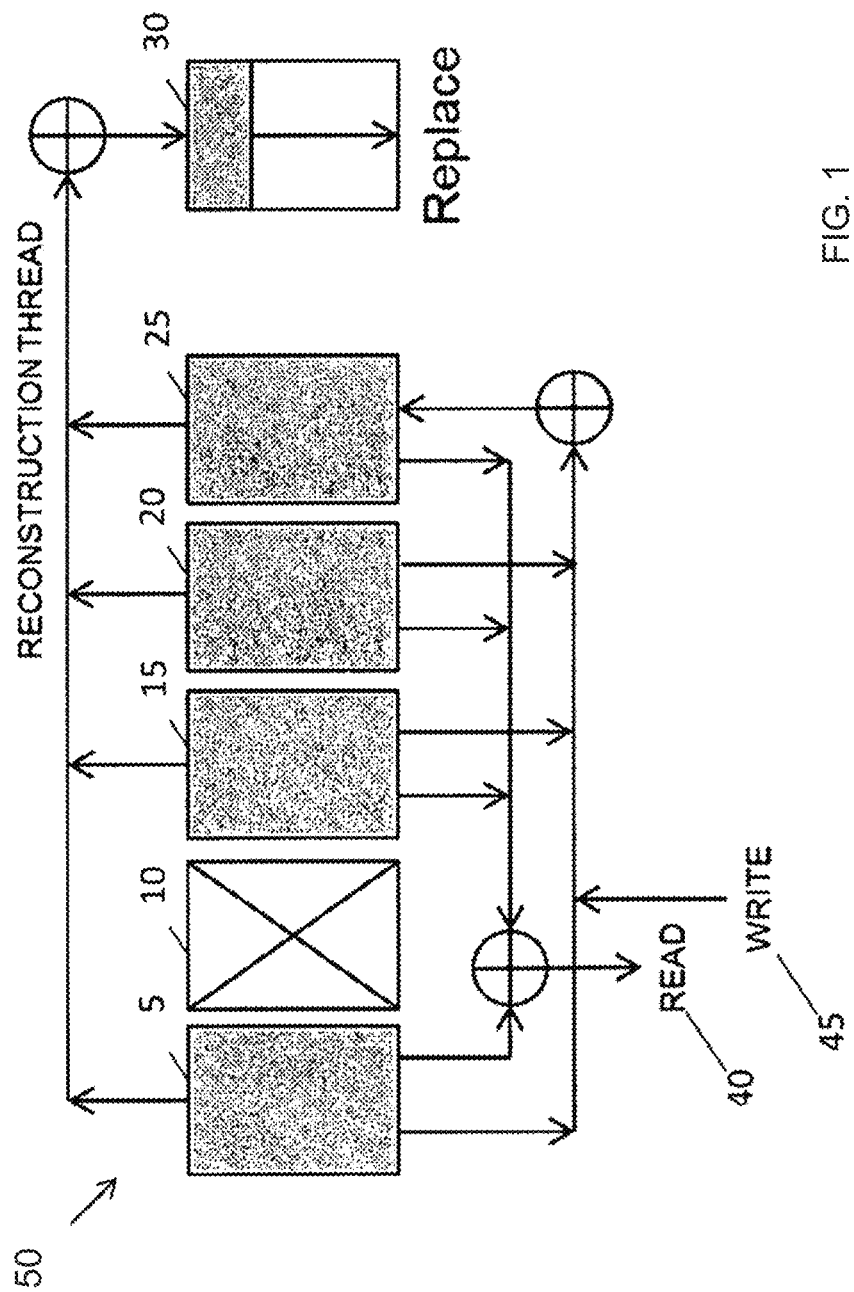
FIG. 1 illustrates a typical RAID system performing an online reconstruction when a disk fails.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for improving the completion time for RAID operations such as RAID reconstruction, well disk copy, rapid RAID recovery and RAID parity scrub. In exemplary embodiments, this is accomplished by selectively limiting the amount of data set considered in the particular raid operation. As used herein, the term "mass data storage system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof (i.e. a workload), embodied as or including a storage system. Moreover, the teachings of this disclosure can be adapted to a variety of storage system architectures including, but not limited to, a network-attached storage (NAS) environment, a storage area network (SAN), a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a Write Anywhere File Layout (WAFL®) file system.

It is desirable to improve the completion time for RAID reconstruction operations, and one way to do so is by selectively limit the amount of data to reconstruct. Aspects of this disclosure are directed to methods, non-transitory computer readable media, and devices for tracking the highest disk block number (DBN) a file system has written to the RAID group and implementing that information to selectively limit the number of stripes are to be read and reconstructed. Disclosed, for example, is an alternative to performing a full disk reconstruction. Rather, RAID is reconstructing only a partial set of stripes, thus reducing the amount of data to read, XOR, reconstruct and write to the reconstructing disk. In this way, selectively limiting the data leads to faster reconstruction completion time compared to a full disk reconstruction. This assumes the sustained reconstruction rate is constant. Furthermore, by selectively limiting the amount of data the RAID operation is working on, the disclosed embodiments improve other RAID operations such as 'well disk copy' (WDC), 'RAID rapid recovery' (sick disk copy—SDC), and 'RAID parity scrub' time.

In certain embodiments, an identifier that records the maximum DBN ever written by the file system is maintained. In certain embodiments, the identifier is maintained using reparity write. A reparity bitmap is created with each bit representing N stripes within the RAID. When a write occurs to a stripe, the associated reparity bit is set to 1; otherwise the bit is set to its default value of zero. Each bit in the reparity bitmap has an associated in-memory write counter. The write counter is used to track the number of writes in progress to a stripe range. Upon initiation of the first write to a stripe range, the reparity bit for the stripe range is set, and the write counter is incremented from its default value to indicate that one write is in progress. Subsequent, concurrent writes cause the write counter to be incremented. The maximum write DBN is updated on disk and in memory. The maximum DBN is the highest DBN represented by the reparity bit being set.

Upon completion of a write to the stripe range, the write counter is decremented. When all writes to the stripe range have been completed, the write counter will have returned to its default value, the reparity bit is cleared, and the reparity bitmap is written to disk. Using the write counter allows multiple writes to a stripe range without incurring two extra write I/Os (for the bitmap) per stripe write which greatly reduces overhead. In certain embodiments, the maximum write DBN is not cleared from disk while clearing reparity bit set earlier.

The writer first checks the reparity bitmap prior to executing a write. If the bit associated with that stripe is zero, the write counter is incremented for that reparity bitmap bit and the reparity bit is set to 1. The writer can proceed with the stripe write once the reparity bitmap is written to disk.

In the event the reparity bit is already set to 1, the writer increments the write counter and checks to see if the reparity bitmap is in the process of being written to disk. If the reparity bitmap is in the process of being written to disk, the writer waits for the reparity bitmap to be written and then writes the stripe; otherwise, the writer does not need to wait and writes the stripe without waiting.

The max DBN being written is also updated during this process. The granularity of storing the max DBN is reparity bit granularity, or in other words, how many disk blocks are mapped by one reparity bit. The IO max DBN will not be stored on disk, but rather the upper bound of the DBN mapped by that dirty cp bit will be recorded on a disk. In short, whenever RAIDio_start+RAIDio_length exceeds the max recorded DBN, the max recorded DBN will be updated in memory and on-disk. Although various embodiments can be introduced to maintain an identifier that records the maximum DBN written by the file system, associating the identifier with reparity provides a no-cost advantage for maintaining this identifier.

Figure 2:
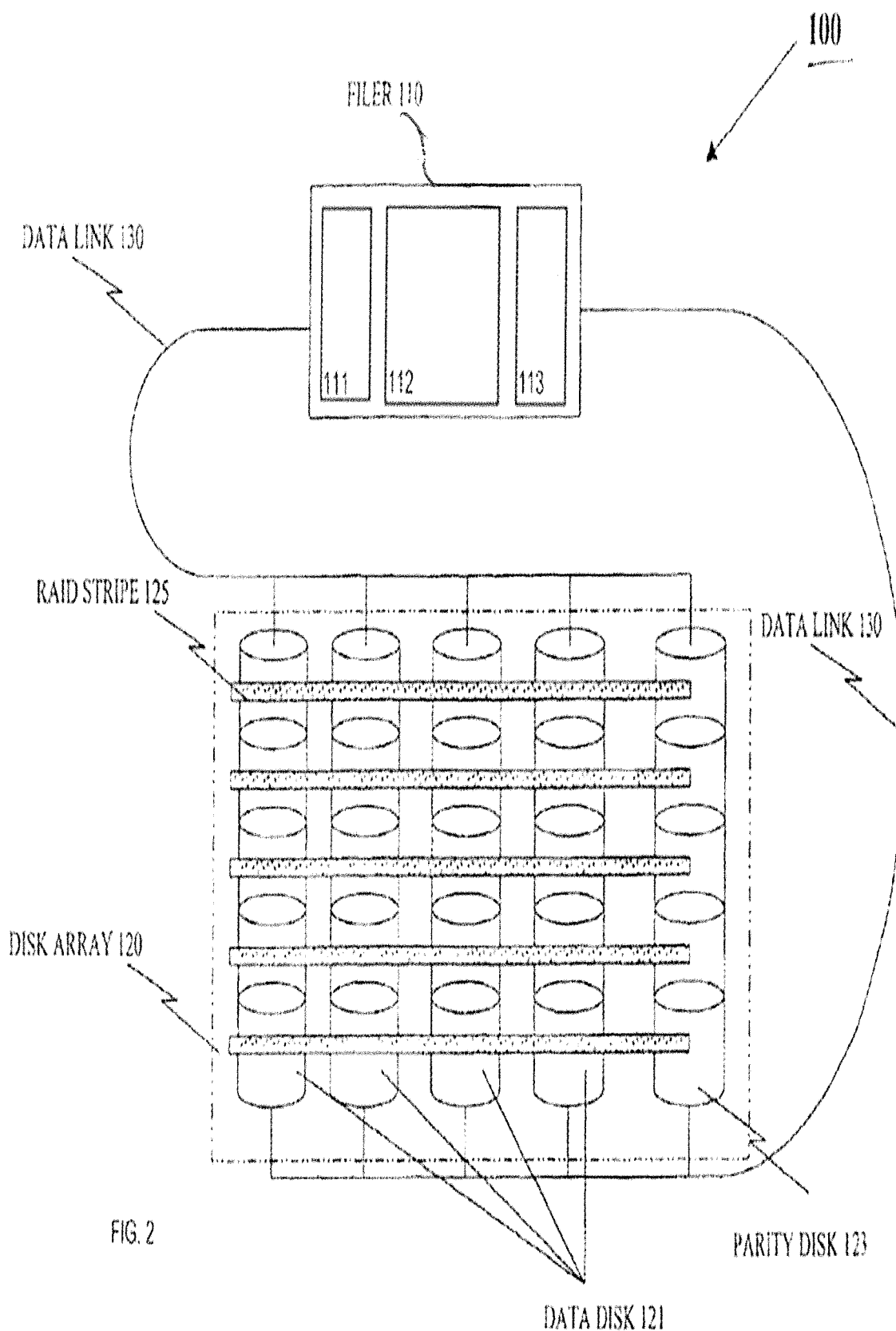
FIG. 2 exemplifies a schematic block diagram of a file system for reparity bitmap RAID failure recovery in accordance with embodiments of the disclosure.

Referring now to the drawings, wherein like reference numerals refer to like features throughout the several views, FIG. 2 is a schematic block diagram of a file system 100 for reparity bitmap RAID failure recovery, which can be advantageously used with the present disclosure. The file system 100 includes a filer 110 (file server dedicated to the storage and retrieval of electronic data), a disk array 120, and a data link 130. Filer 110 includes a processor 111, a main memory 112, and software 113 for executing instructions. The software 113 preferably includes software for managing a RAID storage system according to certain embodiments. For the purposes of this disclosure, a RAID storage system can be defined as a category of disk drives that employ two or more drives in combination for fault tolerance and performance. Although the filer 110 and the disk array 120 are shown as separate devices, one of ordinary skill in the art would understand there is no requirement that they be physically separate.

In a RAID configuration according to one example, the disk array 120 includes two or more data disks 121, a parity disk 123, and a RAID stripe 125. For the purposes of this disclosure, a RAID stripe can be defined as a set of data, often including parity information, saved across two or more hard disk drives that comprise a RAID subsystem. A RAID stripe 125 includes data written to the data disk 121 and parity data written to the parity disk 123. The parity disk 123 includes parity information related to each RAID stripe 125. RAID level 4 is used in a preferred embodiment; however, one of ordinary skill would understand that there is no requirement that RAID level 4 be implemented, and other levels of RAID may also be utilized. RAID level configurations are well-known in the art. A data link 130 operates to couple the filer 110 to the disk array 120. In a preferred embodiment, the data link 130 includes a direct wired connection. In alternative embodiments, the data link 130 may include alternative forms of communication, such as the Internet, an intranet, extranet, virtual private network, wireless network, or some combination thereof.

Figure 3:
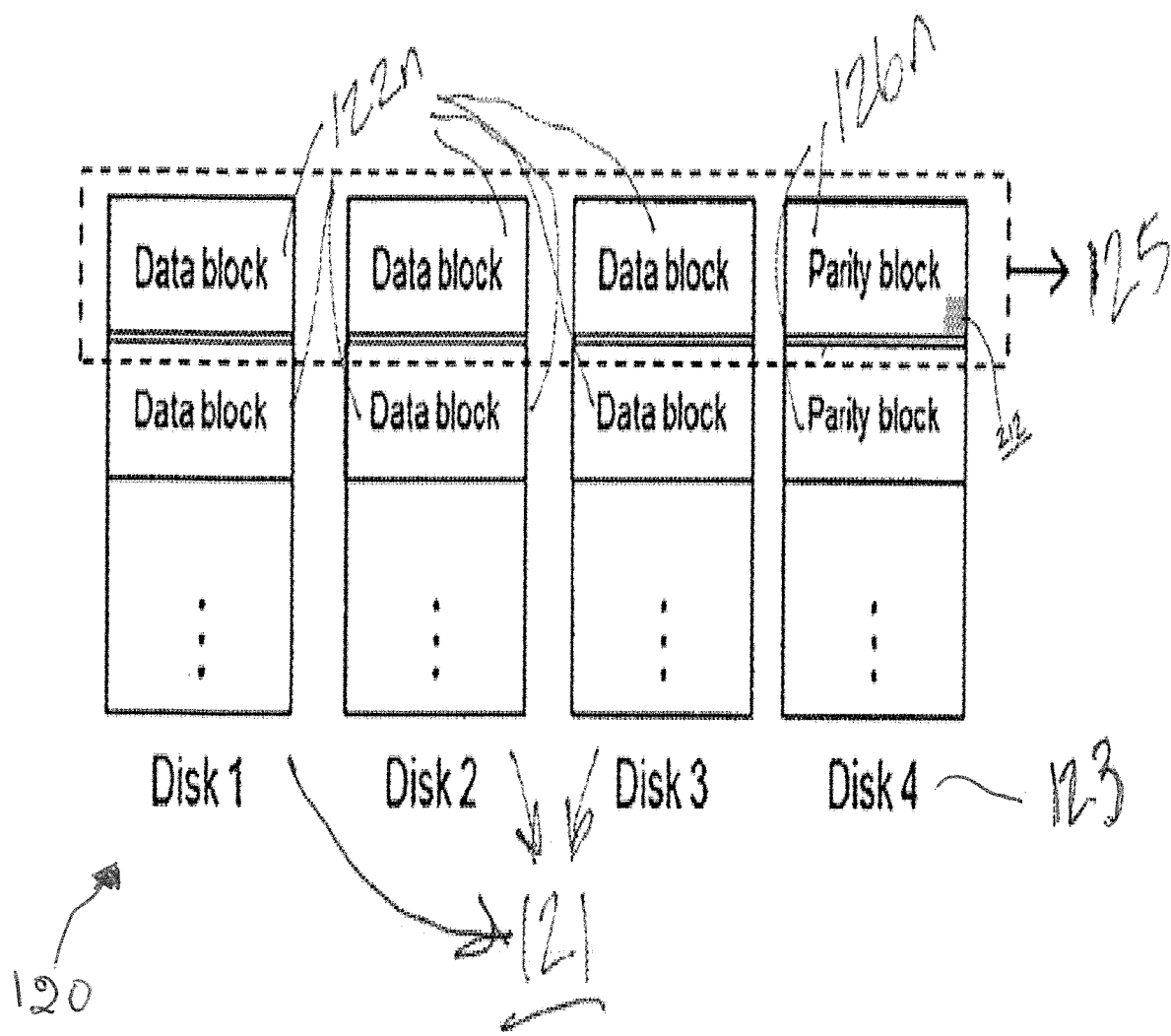
FIG. 3 exemplifies a schematic block diagram of the disk array in accordance with an exemplary embodiment of the disclosure.

FIG. 3 is a schematic block diagram of the disk array 120 that can be advantageously used with the present disclosure. As shown in FIG. 3, a RAID stripe 125 can be composed of multiple blocks. Each block of the RAID stripe 125 can reside in a different disk. For example, the data disks 121 can include data blocks 122n, whereas the parity disk 123 can include parity blocks 126n. As show in the example of FIG. 2, the parity blocks 126n of the enclosed first RAID stripe can reside over the disks 1-4 of data disks 121. A block in the RAID stripe 125 can either be a data block 122n or a parity block 126n with a typical size of approximately 4 KB. That is, a data block contains 4096 bytes or 4 KB of data. A data block 122n can hold user data, whereas a parity block 126n can hold parity value(s) computed from the data blocks 122n of the RAID stripe according to certain parity algorithm, which can use XOR computation.

The parity disk 123 stores reparity bitmap and header information including a reparity bitmap 212 and header information (not shown). The header information includes a version number, checksum, the number of stripes tracked per bit (described in further detail below), and the number of bits in the reparity bitmap 212. The reparity bitmap 212 includes electronic data collectively configured as a bitmap. Each bit within the reparity bitmap 212 is mapped to a range of RAID stripes 125. In a preferred embodiment, the reparity bitmap 212 is stored on the parity disk 123. However, one of ordinary skill in the art would understand there is no requirement that the reparity bitmap 212 be stored on the parity disk 123. In alternative embodiments, the reparity bitmap 212 can be stored on one or more of the plurality of data disks 121, in a non-volatile random access memory, or some other form of memory or a combination thereof.

In an exemplary embodiment, disk 121 can include 1024 gigabytes of capacity. Furthermore, each disk 121 can be logically divided into 512 zones, hence called reparity zones. The reparity bitmap 212 is used to track whether that zone is written or not. In an exemplary embodiment, one bit of the reparity bitmap 212 represents one reparity zone. Thus, 512 bits or the reparity bitmap 212 represents all of the 512 zones of the disk 121. In this exemplary embodiment, one bit maps 2 gigabytes of disk 121 capacity (1024 gigabytes of capacity/512 zones of the disk). Thus, bit zero maps from DBN zero until it reaches 2 gigabytes of data. Bit one maps from 2 gigabytes of data to 4 gigabytes of data. This process continues until bit 511 maps the last zone of the disk or DBN 512, from 1022 gigabytes to 1024 gigabytes of the disk 121.

Figure 4:
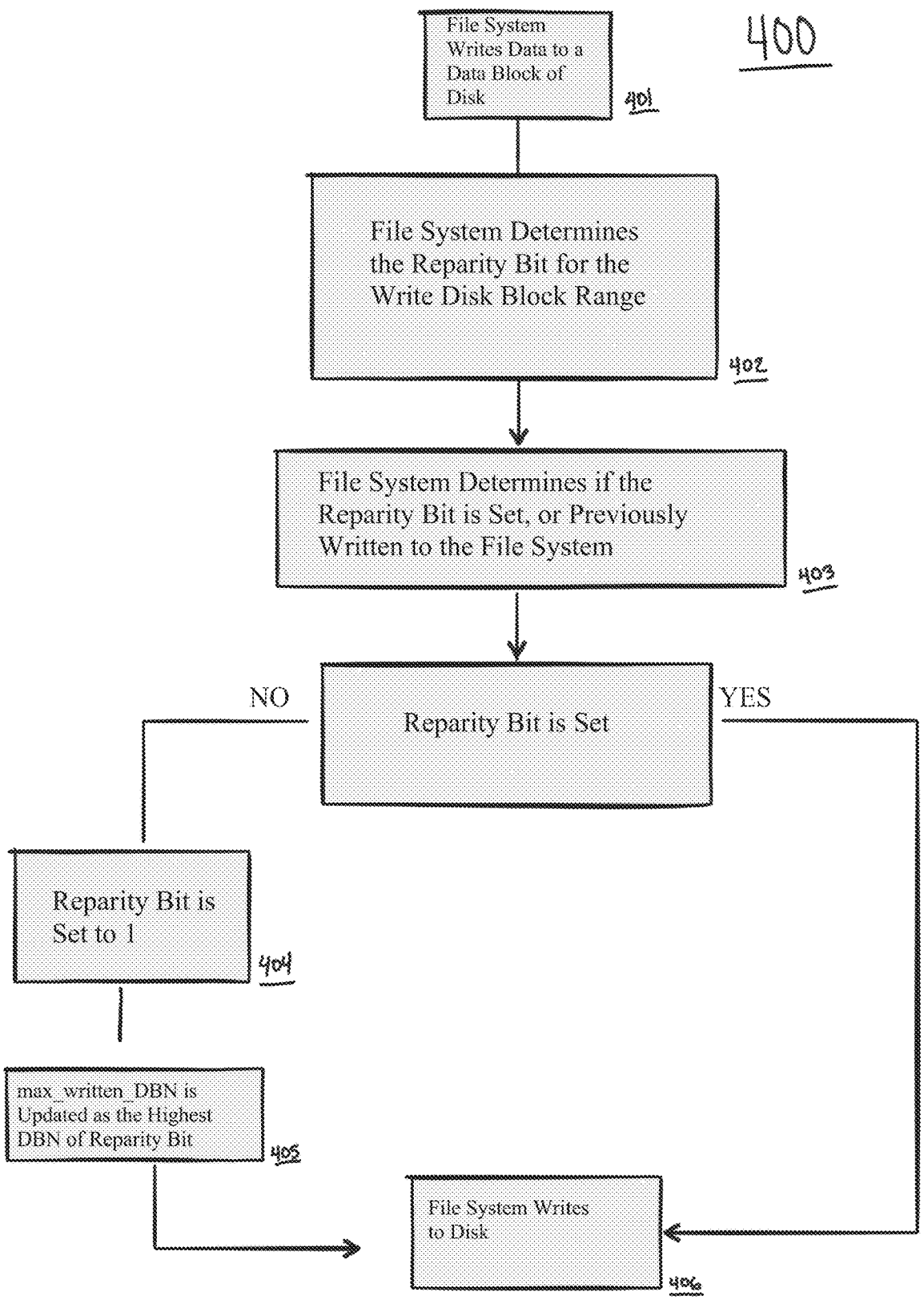
FIG. 4 illustrates a process flow diagram of a method for updating the max_written_DBN in accordance with an exemplary embodiment of the disclosure.

FIG. 4 illustrates a process flow diagram of a method for updating the max_written_DBN, indicated by general reference character 400. The max_written_DBN updating process 400 commences at step 401 where the file system 100 writes data to a data block 122n of disk 121. The file system 100 determines the reparity bit for the write disk block range at step 402. For example, the disk write can be for writing DBN 2201. This write maps to reparity bit 2201/512, or the fifth bit of the reparity map 212. At step 403, the file system 100 determines if the reparity bit is set, or previously written to the file system 100. In this example, the file system 100 determines if the fifth bit is set. If the bit has not been set, the max_written_DBN updating process 400 advances to step 404 where the reparity bit is set to 1. Furthermore, the max_written_DBN updating process 400 advances to step 405 where the max_written_DBN is updated as the highest DBN of reparity bit being set. In this example, if it is determined that the write has not been written to the file system and the fifth bit is not set, the max_written_DBN is written as 2560 (i.e, 5×512). Where the bit has been set, the max_written_DBN updating process 400 advances to step 406 where the file system 100 writes to disk 121. Furthermore, the max_written_DBN updating process 400 advances to step 406 where the max_written_DBN is updated as the highest DBN of reparity bit being set.

The max_written_dbn, can be implemented in different RAID operations such as reconstruction of a failed disk, scrub, filesystem disk copy, disk zeroing. By implementing the max_written_DBN those RAID operations do not need to be implemented on entire disks. Instead, each enumerated RAID operation can be carried out until it crosses the max_written_dbn. At that point, the RAID operation is sufficient to terminate and consider itself complete. For example, most file systems typically require full disk reconstruction. In the present example of a 1024 gigabyte disk, if this disk fails, typical file systems would require reconstruction of all 1024 gigabytes. However, if the max_written_dbn for the failed disk is determined to be 'x' (i.e., a number between 0 and the DBN disk capacity), reconstruction with the max_written_DBN updating process 400 needs to reconstruct only till dbn 'x'.

Figure 5:
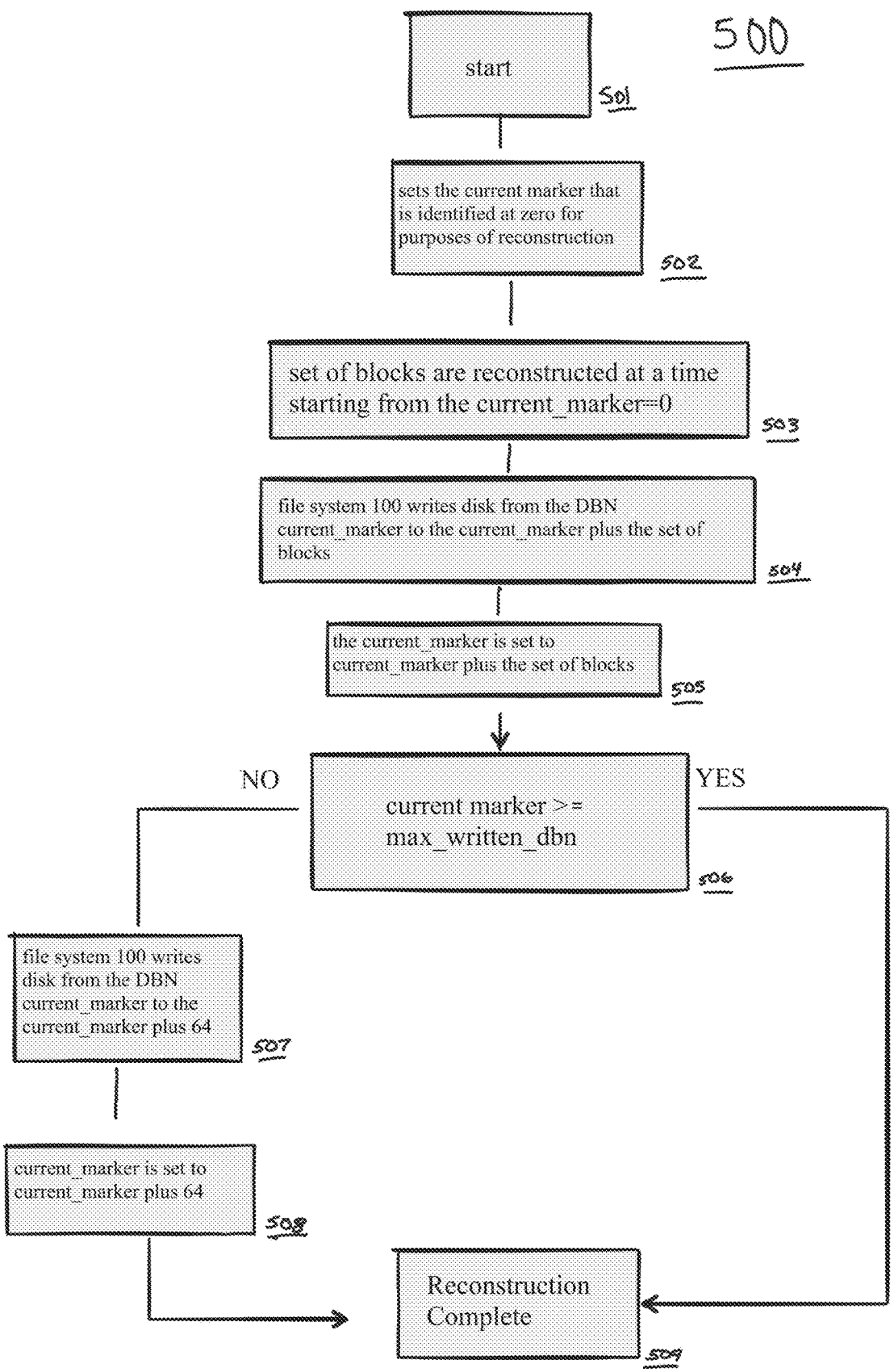
FIG. 5 illustrates a process flow diagram of a method for selective RAID failure recovery in accordance with an exemplary embodiment of the disclosure.

Following a system failure and failure of other contingency strategies (e.g. nonvolatile RAM), parity recomputation occurs as is provided in conventional RAID systems. However, unlike conventional systems, recomputation need only occur on those RAID stripes 125 where the data blocks 122n were written by the file system. FIG. 5 illustrates a process flow diagram of a method for selective RAID failure recovery where max_written_DBN is used to terminate the operation, indicated by general reference character 500. The selective RAID failure recovery process 500 initiates at a 'start' terminal 501.

The selective RAID failure recovery process 500 continues to a 'reconstruction current_marker-0' procedure 502, which sets the current marker that is identified at zero for purposes of reconstruction. Once the current marker is set at zero, the selective RAID failure recovery process process 500 advances to step 503 where a set of blocks are reconstructed at a time starting from the current_marker-0. In certain embodiments, 64 blocks can be reconstructed at a time starting from the current marker. The selective RAID failure recovery process ? 500 advances to step 504, the file system 100 writes disk from the DBN current_marker to the current_marker plus the set of blocks. For example, where 64 blocks are reconstructed at a time, the file system 100 writes disk from the DBN current_marker to the current_marker plus 64. This process is continued for the next set of blocks. The selective RAID failure recovery process 500 advances to step 505 where the current_marker is set to current_marker plus the set of blocks (e.g., 64). The selective RAID failure recovery process 500 continues to a 'current marker<max_written_dbn' procedure 506.

If the 'current marker<max_written_dbn' decision procedure 506 determines the operation is past the max_written_dbn, the selective RAID failure recovery process 500 terminates the operation at 509. However, if the 'current marker<max_written_dbn' decision procedure 506 determines the operation is not past the max_written_dbn, the selective RAID failure recovery process 500 advances to step 507 where the file system 100 writes disk from the DBN current_marker to the current_marker plus 64. This process is continued for the next set of blocks. The selective RAID failure recovery process 500 advances to step 508 where the current_marker is set to current_marker plus the set of blocks (e.g., 64). This process continues until the 'current marker<max_written_dbn' decision procedure 506 determines the operation is past the max_written_dbn, and the selective RAID failure recovery process 500 terminates the operation at 509.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

What is claimed:

1. A method, comprising:
updating, by a processor of a storage system, a threshold written disk block number indicating a maximum written disk block number representing a last written disk block number corresponding to a reparity bit of a reparity bitmap having a plurality of reparity bits, each reparity bit configured to track progress of writes to a disk block range corresponding to each reparity bit;
setting by the processor, a current reconstruction marker for a selective RAID (Redundant Array of Independent Disks) reconstruction operation of a failed disk of the storage system, the current reconstruction marker indicating beginning of the selective reconstruction operation;
reconstructing by the processor, a set of blocks at a time starting from the current reconstruction marker;
writing, by the processor, disks from a disk block number at the current reconstruction marker and the set of blocks;
updating, by the processor, the current reconstruction marker by the set of blocks;
continuing, by the processor, to reconstruct the failed disk and updating the current reconstruction marker until the updated current reconstruction marker reaches the threshold written disk block number; and
terminating the selective reconstruction operation upon reaching the threshold written disk block number.

2. The method of claim 1, further comprising:
updating, by the processor, the threshold written disk block number with a highest disk block number for the reparity bit, in response to a file system of the storage system identifying the reparity bit and determining that the reparity bit is not set.

3. The method of claim 2, further comprising:
resetting, by the processor, the reparity bit, in response to the file system determining that the reparity bit is not set.

4. The method of claim 2, further comprising:
prior to the reconstruction operation, a file system of the storage system writing to a disk of the storage system, in response to a determination that the reparity bit is set.

5. The method of claim 1, wherein the reparity bitmap is stored in a RAID parity disk.

6. The method of claim 1, wherein the reparity bitmap is stored in a RAID non-parity disk.

7. The method of claim 1, wherein the reconstruction operation comprises a file system disk copy operation.

8. A non-transitory machine-readable medium having stored thereon instructions for performing a method comprising machine executable code which when executed by at least one machine, causes the at least one machine to:
update a threshold written disk block number indicating a maximum written disk block number representing a last written disk block number corresponding to a reparity bit of a reparity bitmap having a plurality of reparity bits, each reparity bit configured to track progress of writes to a disk block range corresponding to each reparity bit in a storage system;
set a current reconstruction marker for a selective RAID (Redundant Array of Independent Disks) reconstruction operation of a failed disk of the storage system, the current reconstruction marker indicating beginning of the selective reconstruction operation;
reconstruct a set of blocks at a time starting from the current reconstruction marker;
write disks from a disk block number at the current reconstruction marker and the set of blocks;
update the current reconstruction marker by the set of blocks;
continue to reconstruct the failed disk and update the current reconstruction marker until the updated current reconstruction marker reaches the threshold written disk block number; and
terminate the selective reconstruction operation upon reaching the threshold written disk block number.

9. The non-transitory machine-readable medium of claim 8, wherein the machine executable code further causes the at least one machine to:
update the threshold written disk block number with a highest disk block number for the reparity bit, in response to a file system of the storage system identifying the reparity bit and determining that the reparity bit is not set.

10. The non-transitory machine-readable medium of claim 9, wherein the machine executable code further causes the at least one machine to:
reset the reparity bit, in response to the file system determining that the reparity bit is not set.

11. The non-transitory machine-readable medium of claim 8, wherein the machine executable code further causes the at least one machine to:
prior to the reconstruction operation, a file system of the storage system writes to a d isk of the storage system in response to a determination that the reparity bit is set.

12. The non-transitory machine-readable medium of claim 8, wherein the reparity bitmap is stored in a RAID parity disk.

13. The non-transitory machine-readable medium of claim 8, wherein the reparity bitmap is stored in a RAID non-parity disk.

14. The non-transitory machine-readable medium of claim 8, wherein the
reconstruction operation comprises a file system disk copy operation.

15. A computing device, comprising:
a memory containing machine readable medium comprising machine executable code having stored thereon instructions; and
a processor coupled to the memory, the processor configured to execute the machine executable code to cause the processor to:
update a threshold written disk block number indicating a maximum written disk block number representing a last written disk block number corresponding to a reparity bit of a reparity bitmap having a plurality of reparity bits, each reparity bit configured to track progress of writes to a disk block range corresponding to each reparity bit in a storage system;

set a current reconstruction marker for a selective RAID (Redundant Array of Independent Disks) reconstruction operation of a failed disk of the storage system, the current reconstruction marker indicating beginning of the selective reconstruction operation;

reconstruct a set of blocks at a time starting from the current reconstruction marker;

write disks from a disk block number at the current reconstruction marker and the set of blocks;

update the current reconstruction marker by the set of blocks;

continue to reconstruct the failed disk and update the current reconstruction marker until the updated current reconstruction marker reaches the threshold written disk block number; and terminate the selective reconstruction operation upon reaching the threshold written disk block number.

16. The computing device of claim 15, wherein the machine executable code further causes to:
update the threshold written disk block number with a highest disk block number for the reparity bit, in response to a file system of the storage system identifying the reparity bit and determining that the reparity bit is not set.

17. The computing device of claim 16, wherein the machine executable code further causes to:
reset the reparity bit, in response to the file system determining that the reparity bit is not set.

18. The computing device medium of claim 15, wherein the machine executable code further causes to:
prior to the reconstruction operation, a file system of the storage system writes to a disk of the storage system in response to a determination that the reparity bit is set.

19. The computing device of claim 15, wherein the reparity bitmap is stored in a RAID parity disk.

20. The computing device of claim 15, wherein the reparity bitmap is stored in a RAID non-parity disk.

* * * * *